United States Patent [19]

Dawson

[11] Patent Number: 4,479,988

[45] Date of Patent: Oct. 30, 1984

[54] SPACER BAR FOR DOUBLE GLAZING

[75] Inventor: Charles D. Dawson, Winchcombe, England

[73] Assignee: Reddiplex Limited, Droitwich, England

[21] Appl. No.: 392,707

[22] Filed: Jun. 28, 1982

[30] Foreign Application Priority Data

Jul. 2, 1981 [GB] United Kingdom ................. 8120416

[51] Int. Cl.³ ........................... E06B 3/24; B32B 3/20

[52] U.S. Cl. ........................................ 428/34; 52/172; 52/309.1; 52/309.14; 52/397; 52/398; 52/399; 52/790; 156/99; 156/107; 156/109; 428/412

[58] Field of Search .................... 428/34, 412; 52/398, 52/399, 172, 790, 309.14, 397, 309.1; 156/109, 107, 99

[56] References Cited

U.S. PATENT DOCUMENTS

| | | | |
|---|---|---|---|
| 3,758,996 | 9/1973 | Bowser | 428/34 |
| 3,791,910 | 2/1974 | Bowser | 428/34 |
| 4,204,015 | 5/1980 | Wardlow | 428/34 |
| 4,305,982 | 12/1981 | Hirsch | 428/34 |
| 4,335,166 | 6/1982 | Lizardo | 428/34 |
| 4,341,835 | 7/1982 | MacDowell | 428/412 |
| 4,433,016 | 2/1984 | Neely | 428/34 |

*Primary Examiner*—Ellis P. Robinson
*Attorney, Agent, or Firm*—Scrivener, Clarke, Scrivener and Johnson

[57] ABSTRACT

A spacer bar for double glazing is made as a hollow extrusion of polycarbonate, preferably incorporating about 20% of glass fibre reinforcement.

4 Claims, 1 Drawing Figure

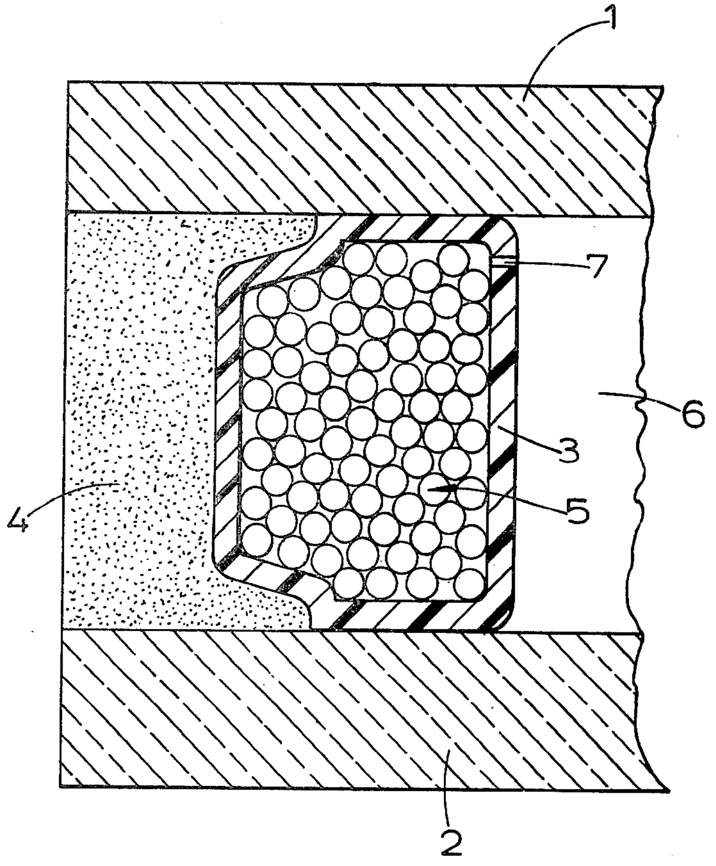
1
7
6
3
5
4
2

SPACER BAR FOR DOUBLE GLAZING

This invention relates to spacer bars for holding apart the two panes of glass that are used to form a double glazing unit. Conventionally such bars have been made of hollow metal sections, usually an aluminium alloy, either in the form of an extrusion or by rolling from flat strip material. The hollow interior of the bar contains a dessicant which is in communication with the space between the panes through a series of holes in that face of the hollow section which is towards this space. The space between the panes contains a dry inert gas, usually nitrogen, and the purpose of the desiccant is to absorb any residual moisture that may still be present.

The section is generally rectangular, with shoulders or steps in two opposed faces and is formed into a rectangular frame by cutting and mitring. This frame is then placed between the panes, which are sealed together by means of a mastic sealant, usually based on a polysulphide.

Such spacer bars are widely used and are generally satisfactory. However, metals, especially aluminium, have a relatively high thermal conductivity and, now that surrounding window frames often include so-called "thermal breaks", the aluminium of the spacer bar forms an appreciable leakage path for heat flow, by-passing the thermal break and the gap formed by the space between the panes. In practice this effect can manifest itself as a visible line of condensation on the outside of the glass close to its edge, a point which seriously detracts from the attractiveness of double glazing to the user.

Attempts have been made, therefore, to substitute plastics for metal, on the ground of their much lower thermal conductivity. However such attempts have hitherto failed, not only on account of the lack of stiffness and strength of the plastics material chosen, but, more important, because of the tendency, after a few months or years of use, to clouding of the inaccessible inner surfaces of the panes of glass by deposits from the plastics material. For example, attempts to use polyvinyl chloride have resulted in the deposit of residual uncombined vinyl chloride monomer still present in the plastics. ABS resins have also been tried, but these have failed through lack of thermal resistance, as they collapse at the temperatures involved during the application of the mastic sealant.

A further problem with many plastics is that of absorption of water; if water is absorbed from the atmosphere, it will eventually penetrate to the space between the panes.

The aim of the invention is to allow the adoption of plastics material, with its advantages in weight, cost and above all thermal conductivity, and without the drawbacks mentioned above. According to the invention we propose that a spacer bar for a double glazing unit should be formed from a hollow extrusion of polycarbonate material. Unexpectedly it is found that polycarbonate gives the required strength and stiffness without having the above-mentioned drawbacks; even though its softening temperature is below the temperature at which the conventional polysulphide adhesives are used, it is found that it can safely be used as the adjacent glass forms a heat sink that withdraws the heat sufficiently rapidly to avoid collapse of the strip.

Preferably the polycarbonate is not in its pure state but is filled with a glass fibre reinforcement and the preferred range of filler is at least ten percent but not more than forty percent. Under ten percent gives insufficient striffness for ideal results and over forty percent gives rise to undue brittleness. In practice we find the best percentage, by weight, of glass fibre filler is twenty percent.

Polycarbonate, as a material available for use, has been known for twenty years, yet hitherto has not been proposed or even considered for the purpose in question. It is believed that this fact is attributed to the known difficulties in extruding it satisfactorily, and to its known softening point, which was, perhaps, assumed to be too low.

The invention will now be further described by way of example. The accompanying drawing is a section through a portion of a double glazing unit incorporating the spacer bar according to the invention, and the construction is basically the same as that using a conventional metal bar. The two panes of glass 1 and 2 are held apart by a hollow bar 3 of basically rectangular section, but with shoulders, and secured together by a polysulphide adhesive or mastic sealant 4 which bonds not only to the glass but also to the outer face of the bar 3. Granules of desiccant 5 placed within the hollow bar before assembly are in communication with the nitrogen in the space 6 between the panes through holes, of which one is visible at 7, in the inner face of the bar, to keep that space free of moisture that could otherwise condense and obscure the glass. The ends of the straight lengths of hollow bar are mitred and joined to adjacent lengths at the corners of the unit by L-shaped corner pieces forced into the ends of the bars. All this is known except that, instead of using a bar of metal we use an extruded hollow section of polycarbonate.

The bar illustrated is 12 mm wide (between the panes) and 9 mm deep. The wall thickness is a nominal 1 mm.

In the example shown, the extrusion is of the material sold by General Electric Plastics under the Registered Trade Mark Lexan, and in particular the grade known as Lexan 3412, which contains 20% of glass fibre reinforcement by weight. The material also contains a colouring pigment which gives it a white colour, although other colours, including black, could be used. Lexan 500, which has a lower percentage of glass fibre, has a higher impact performance but less rigidity and is not as satisfactory. Equally, although acceptable results may be obtained with Lexan 3414, which contains 40% of glass reinforcement, brittleness may be a problem.

The adhesive or sealant used may be one of those conventionally used with metal spacing bars, for example a polysulphide or epoxy polysulphide material marketed by Berger Elastomers under the name PR428 or that marketed by Bostik Limited under the name Bostik 3180. In some cases the application of a standard primer coating to the bar following extrusion may be beneficial in achieving a good bond with the adhesive. The full strength of the bond may be developed only after a delay of a few hours.

The polysulphide adhesive is applied at a temperature of between 180° and 200° C. This precludes the use of most plastics, which soften a long way below that range of temperatures. Polycarbonate with 20% of glass fibre softens in the range 160° to 170° C. (Vicat test to DIN 53460) or 140° to 150° C. (Martens test to DIN 53458) but surprisingly it is found that it can be used satisfactorily and this is believed to be because the adjacent glass lowers the temperature sufficiently rapidly to avoid collapse of the bar.

Instead of a polysulphide, a known butyl adhesive may also be used. A coating on the bar may not only improve the adhesion (depending on the adhesive used) but also prevent migration of the adhesive into the polycarbonate material.

I claim:

1. A spacer bar for double glazing comprising a hollow extrusion of polycarbonate material incorporating reinforcing filler of glass fibre.

2. A spacer bar according to claim 1 in which the filler comprises between 10 and 40% by weight of glass fibre.

3. A spacer bar according to claim 2 in which the filler comprises substantially 20% by weight of glass fibre.

4. A double glazing unit employing a spacer bar according to claim 1.

* * * * *